(12) United States Patent
Torii

(10) Patent No.: US 9,007,704 B2
(45) Date of Patent: Apr. 14, 2015

(54) LENS BARREL AND IMAGE PICKUP APPARATUS

(71) Applicant: Canon Kabushiki Kaisha, Tokyo (JP)

(72) Inventor: Shigehiro Torii, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 23 days.

(21) Appl. No.: 13/889,440

(22) Filed: May 8, 2013

(65) Prior Publication Data

US 2013/0308200 A1  Nov. 21, 2013

(30) Foreign Application Priority Data

May 17, 2012   (JP) .................................. 2012-113762

(51) Int. Cl.
| | |
|---|---|
| G02B 7/02 | (2006.01) |
| G02B 15/14 | (2006.01) |
| G02B 7/04 | (2006.01) |
| G02B 15/10 | (2006.01) |
| H04M 1/02 | (2006.01) |

(52) U.S. Cl.
CPC *G02B 7/04* (2013.01); *G02B 7/021* (2013.01); *G02B 15/10* (2013.01); *H04M 1/0266* (2013.01)

(58) Field of Classification Search
USPC .................................. 359/694–704, 811–830
See application file for complete search history.

(56) References Cited

U.S. PATENT DOCUMENTS

| | | | | |
|---|---|---|---|---|
| 8,462,451 | B2* | 6/2013 | Okuda .......................... | 359/823 |
| 8,670,196 | B2* | 3/2014 | Ohno et al. ................... | 359/823 |

FOREIGN PATENT DOCUMENTS

| | | |
|---|---|---|
| JP | 60-45214 A | 3/1985 |
| JP | 6-68017 U | 9/1994 |
| JP | 2005-351926 A | 12/2005 |

* cited by examiner

*Primary Examiner* — Mohammed Hasan
(74) *Attorney, Agent, or Firm* — Rossi, Kimms & McDowell LLP

(57) ABSTRACT

A lens barrel includes a fixed cylinder configured to hold a plurality of lens units that constitute a main optical system, an extender configured to be rotatably held by the fixed cylinder and disposed between the plurality of lens units, a first shaft configured to rotate the extender around a first axis that is parallel to an optical axis of the main optical system so that the extender is inserted into or retracted from an optical path of the main optical system, a second shaft configured to rotate around a second axis that is parallel to the optical axis so as to transmit a rotation to the first shaft, and an exterior member attached to the fixed cylinder, the second shaft is attached to the exterior member, the exterior member is attached to the fixed cylinder, and the rotation of the second shaft is transmitted to the first shaft.

4 Claims, 4 Drawing Sheets

LENS BARREL AND IMAGE PICKUP APPARATUS

BACKGROUND OF THE INVENTION

1. Field of the Invention

The present invention relates to a lens barrel including an extender.

2. Description of the Related Art

Previously, as a lens apparatus (a lens barrel) that is used for a television camera such as an ENG camera, a zoom lens apparatus including an extender is used. The extender inserts a magnification-varying lens into an optical path of an image pickup optical system or retracts it from the optical path so as to change a magnification of an image. The operation of insertion or retraction of the magnification-varying lens is performed by a user to perform a rotating operation of an operating lever that is an electric remote controller or that is provided on a casing (an exterior frame) of the extender.

Japanese Patent Laid-Open No. 2005-351926 discloses an extender apparatus that is configured so that insertion or retraction of the magnification-varying lens with respect to an optical axis is performed by a one-touch operation.

However, the extender apparatus that is disclosed in Japanese Patent Laid-Open No. 2005-351926 is unitized and is built between lens units that constitute a main optical system of the lens barrel. Therefore, when an exterior part to which a zoom ring, a focus ring, an AF switch, an IS switch, or the like is attached needs to be changed in maintenance, the lens units that constitute the main optical system, as well as the extender apparatus, has to be removed. In this configuration, the performance of the main optical system is varied in changing the exterior part, which is not preferable in view of maintainability.

SUMMARY OF THE INVENTION

The present invention provides a lens barrel and an image pickup apparatus that improve maintainability.

A lens barrel as one aspect of the present invention includes a fixed cylinder configured to hold a plurality of lens units that constitute a main optical system, an extender configured to be rotatably held by the fixed cylinder and disposed between the plurality of lens units, a first shaft configured to rotate the extender around a first axis that is parallel to an optical axis of the main optical system so that the extender is inserted into or retracted from an optical path of the main optical system, a second shaft configured to rotate around a second axis that is parallel to the optical axis so as to transmit a rotation to the first shaft, and an exterior member attached to the fixed cylinder, the second shaft is attached to the exterior member, the exterior member is attached to the fixed cylinder, and the rotation of the second shaft is transmitted to the first shaft.

An image pickup apparatus as another aspect of the present invention includes the lens barrel.

Further features and aspects of the present invention will become apparent from the following description of exemplary embodiments with reference to the attached drawings.

DESCRIPTION OF THE PREFERRED EMBODIMENTS

Figure 1:
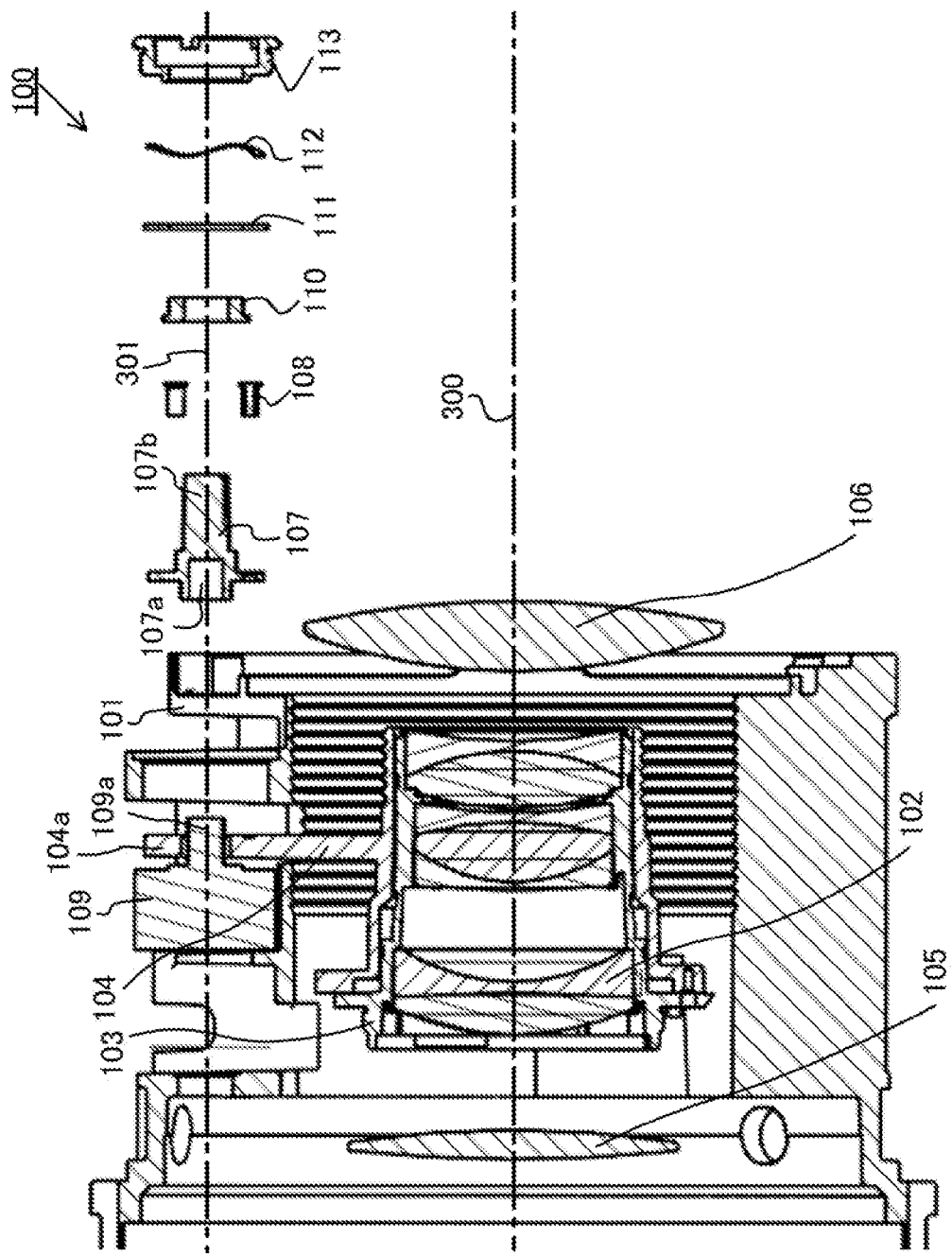
FIG. 1 is a cross-sectional diagram of a fixed cylinder unit that holds a lens unit constituting a main optical system of a lens barrel in Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

Referring to FIGS. 1 to 3, 4A, and 4B, a lens barrel in Embodiment 1 of the present invention will be described. The lens barrel is configured by including a fixed cylinder unit 100 and an exterior ring unit 200 that is attached to the fixed cylinder unit 100.

First of all, referring to FIG. 1, a configuration of the fixed cylinder unit 100 in the present embodiment will be described. FIG. 1 is a cross-sectional diagram of the fixed cylinder unit 100 that holds a plurality of lens units constituting a main optical system of the lens barrel in the present embodiment. In the present embodiment, the fixed cylinder unit 100 is configured so that an extender holding cylinder 104 (an extender) is held by the fixed cylinder 101 rotatably around a rotation center axis 301 (a first axis) that is parallel to an optical axis 300 of the main optical system. The extender holding cylinder 104 is rotatably held by the fixed cylinder 101 and holds an extender barrel 103. The extender barrel 103 holds a first lens unit 102 (a magnification-varying lens). In other words, the first lens unit 102 is held by the extender holding cylinder 104.

An insertion end and a retraction end (both of which are not shown) of the extender holding cylinder 104 are integrally formed on the fixed cylinder 101. The first lens unit 102 is disposed between a second lens unit 105 and a third lens unit 106 (a plurality of lens units) that constitute the main optical system of the lens barrel (a lens barrel body). Each of the second lens unit 105 and the third lens unit 106 is held by a barrel (not shown), and the barrel that holds each of these lens units is attached to the fixed barrel 101. In other words, the second lens unit 105 and the third lens unit 106 are held by the fixed barrel 101.

An arm portion 104a is integrally formed on the extender holding cylinder 104. A first shaft 107 is fixed to the arm portion 104a using a screw 108, and thus the extender holding cylinder 104 and the first shaft 107 are integrated with each other. As described below, the first shaft 107 rotates around the rotation center axis 301 that is parallel to the optical axis 300 so as to rotate the extender holding cylinder 104, and thus the first lens unit 102 is inserted into or retracted from an optical path of the main optical system of the lens barrel (the lens barrel body).

A rotary damper 109 is provided so as to limit a rotation velocity, and is attached to the fixed cylinder 101. A concave portion 107a of the first shaft 107 engages with a convex portion 109a of the rotary damper 109 to be able to perform a rotation transmission. According to this configuration, the rotation is transmitted from the first shaft 107 to the rotary damper 109 around the rotation center axis 301. The first shaft 107 is rotatably supported by a bearing 110. Reference numeral 111 denotes a wave washer receiving plate, reference numeral 112 denotes a wave washer, and reference numeral 113 denotes a screwed bearing that supports the bearing 110. The wave washer receiving plate 111, the wave washer 112, and the bearing 113 are built into the fixed cylinder 101 in this order, and thus the bearing 110 is biased in a direction of the rotation center axis 301.

Figure 2:
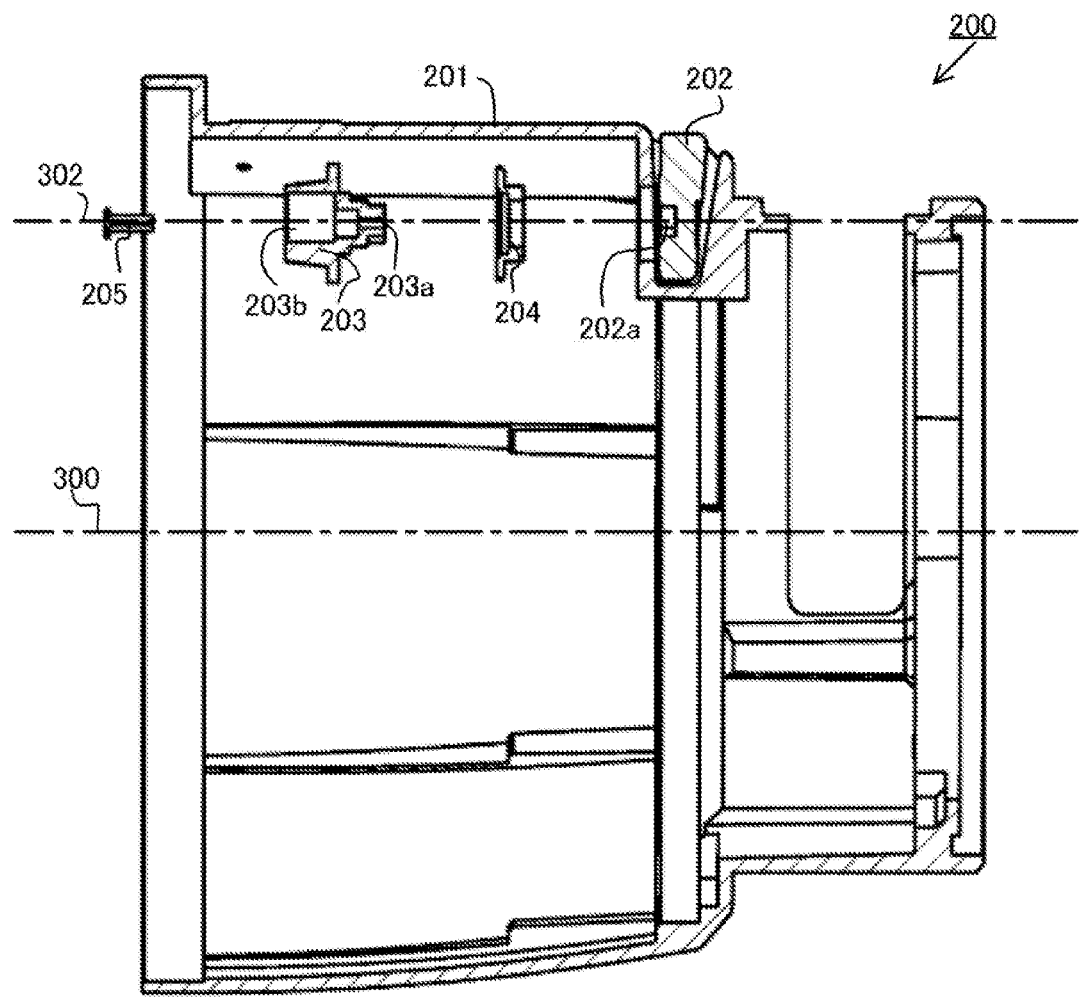
FIG. 2 is a cross-sectional diagram of an exterior ring unit that is attached to the fixed cylinder unit in Embodiment 1.

Next, referring to FIG. 2, a configuration of the exterior ring unit 200 in the present embodiment will be described. FIG. 2 is a cross-sectional diagram of the exterior ring unit 200 that is attached to the fixed cylinder unit 100. An operating lever 202 (an operating member) is provided on an exterior ring 201 (an exterior member) of the exterior ring unit 200. As described below, performing an operation of the operating lever 202, the extender barrel 103 (the first lens unit 102) can be inserted into or retracted from the optical path of the main optical system of the lens barrel (the lens barrel body). In the present embodiment, the operating lever 202 is configured so as to be rotatable with respect to the exterior ring 201 around a rotation center axis 302 (a second axis) that is parallel to the optical axis 300 of the main optical system.

A concave portion 202a of the operating lever 202 engages with a convex portion 203a of a second shaft 203. According to this configuration, the rotation of the operating lever 202 around the rotation center axis 302 is transmitted to the second shaft 203. The second shaft 203 is rotatably supported by a bearing 204 that is built in the exterior ring 201. The operating lever 202 and the second shaft 203 are fixed using a screw 205 to be integrated with each other, and they are attached to the exterior ring 201.

Figure 3:
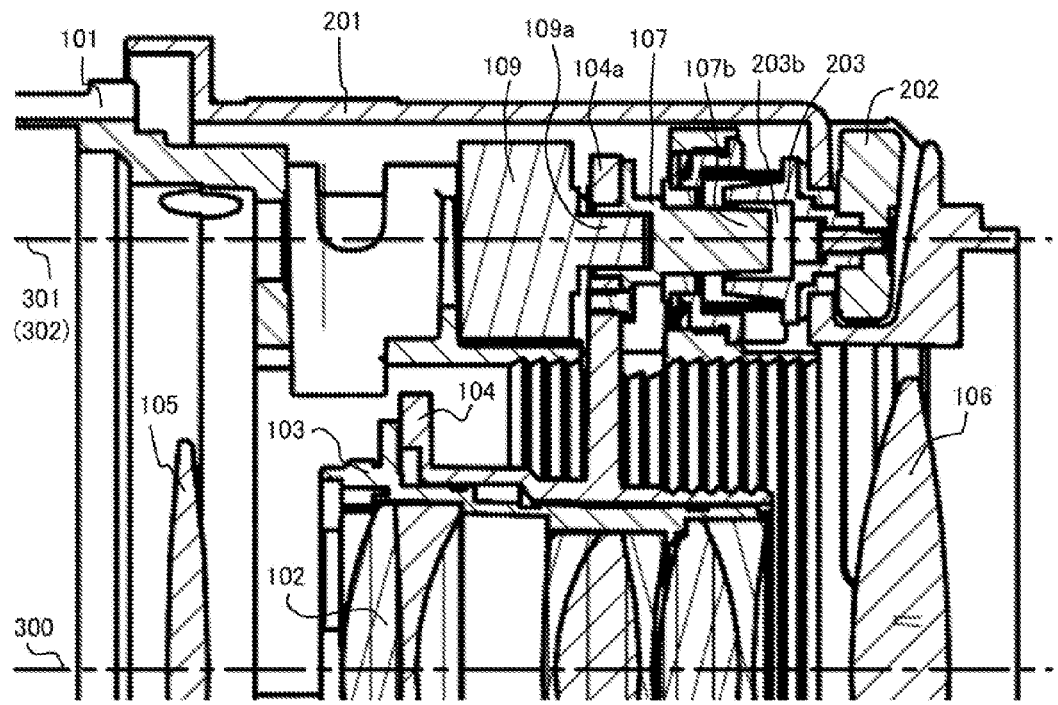
FIG. 3 is a cross-sectional diagram of illustrating a state in which the exterior ring unit is attached to the fixed cylinder unit in Embodiment 1.

Next, referring to FIG. 3, a state in which the exterior ring unit 200 is attached to the fixed cylinder unit 100 will be described. FIG. 3 is a cross-sectional diagram of illustrating the state in which the exterior ring unit 200 is attached to the fixed cylinder unit 100. In the present embodiment, as illustrated in FIG. 3, the rotation center axis 301 (the first axis) and the rotation center axis 302 (the second axis) are the same axis. In other words, both the first shaft 107 and the second shaft 203 are positioned on the same axis.

The exterior ring unit 200 (the exterior ring 201) is attached to the fixed cylinder unit 100 (the fixed cylinder 101), and thus a convex portion 107b of the first shaft 107 and a concave portion 203b of the second shaft 203 engage with each other to be able to perform a rotation transmission. In other words, the rotation of the second shaft 203 around the rotation center axis 302 can be transmitted to the first shaft 107. The exterior ring unit 200 is fixed to the fixed cylinder unit 100 using a screw (not shown). Thus, in the present embodiment, performing the operation (the rotation) of the operating lever 202, the rotation of the second shaft 203 around the rotation center axis 301 is transmitted to the first shaft 107. Therefore, performing the operation of the operating lever 202, the extender holding cylinder 104 (the first lens unit 102) can be inserted into or retracted from the optical path of the main optical system of the lens barrel (the lens barrel body).

Figures 4A, 4B:
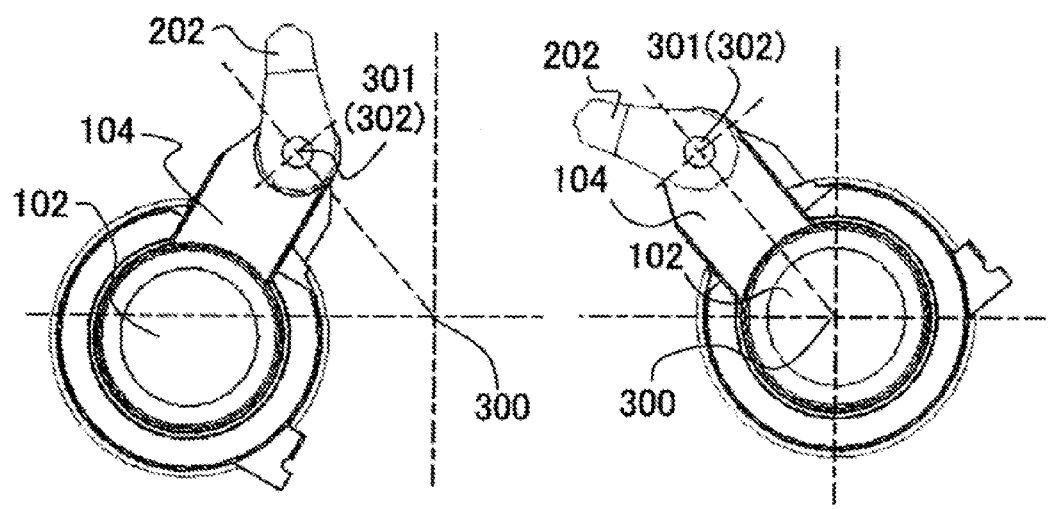
FIGS. 4A and 4B are diagrams of illustrating an extender holding cylinder and an operating lever in Embodiment 1.

FIGS. 4A and 4B are diagrams of illustrating operations of the extender holding cylinder 104 (the first lens unit 102) and the operating lever 202. FIG. 4A illustrates a state in which the first lens unit 102 is retracted from the optical path, and FIG. 4B illustrates a state in which the first lens unit 102 is inserted into the optical path.

As illustrated in FIGS. 4A and 4B, rotating the operating lever 202, the extender holding cylinder 104 is rotated so that the first lens unit 102 can be inserted into or retracted from the optical path. In the present embodiment, when the operating lever 202 is rotated in a clockwise direction, a center position of the first lens unit 102 is displaced from the optical axis 300 and the first lens unit 102 is retracted from the optical path (FIG. 4A). On the other hand, when the operating lever 202 is rotated in a counterclockwise direction, the center position of the first lens unit 102 coincides with the optical axis 300 and the first lens unit 102 is inserted into the optical path (FIG. 4B). However, the present embodiment is not limited to this, and the relation between the rotation direction of the operating lever 202 and the insertion or the retraction of the first lens unit 102 may also be set conversely.

Embodiment 2

Next, referring to FIGS. 5A and 5B, a lens barrel in Embodiment 2 of the present invention will be described. In the present embodiment, the rotation center axis 301 (the first axis) and the rotation center axis 302 (the second axis) are not the same axis, i.e. the rotation center axis 301 is different from the rotation center axis 302, and thus the present embodiment is different from Embodiment 1 in which the first axis and the second axis are the same axis. Other configurations are the same as those of Embodiment 1, and therefore descriptions relating to the configurations will be omitted.

Figures 5A, 5B:
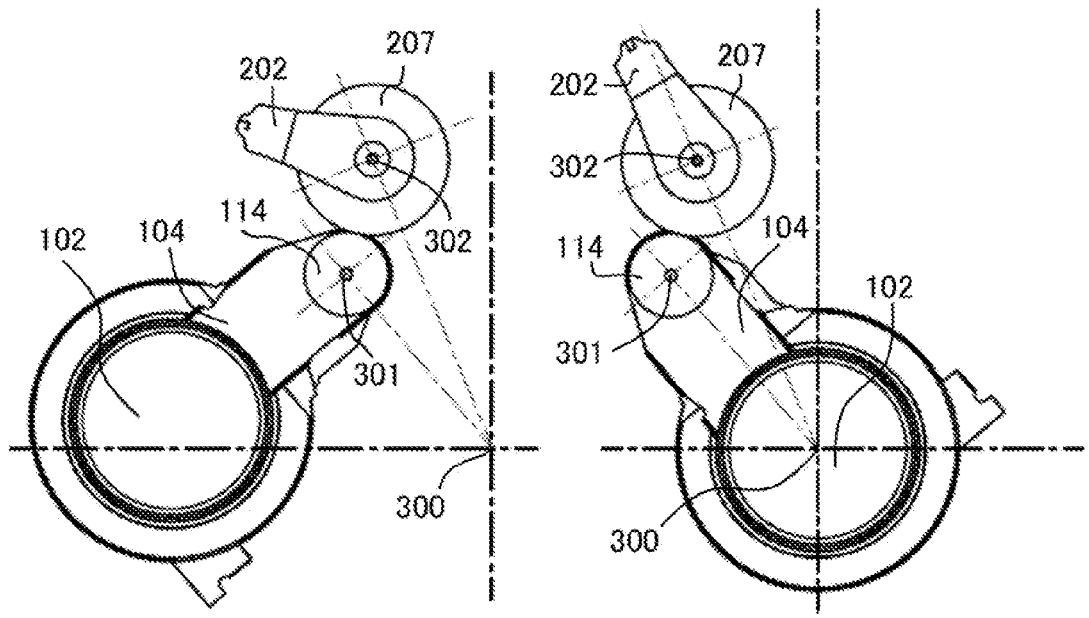
FIGS. 5A and 5B are diagrams of illustrating a motion of the extender holding cylinder and the operating lever in Embodiment 2.

FIGS. 5A and 5B are diagrams of illustrating the operations of the extender holding cylinder 104 (the first lens unit 102) and the operating lever 202. FIG. 5A illustrates a state in which the first lens unit 102 (the magnification-varying lens) is retracted from the optical path, and FIG. 5B illustrates a state in which the first lens unit 102 is inserted into the optical path.

In the present embodiment, a first gear 114 is attached to the first shaft 107 that is fixed to the extender holding cylinder 104 (see FIG. 1). A second gear 207 is attached to the second shaft 203 that is fixed to the operating lever 202 (see FIG. 2). The first shaft 107 and the second shaft 203 are disposed so as not to be on the same axis, i.e. differently from each other. The first gear 114 rotates around the rotation center axis 301, and the second gear 207 rotates around the rotation center axis 302.

In this configuration, attaching the exterior ring unit 200 to the fixed cylinder unit 100, the first gear 114 and the second gear 207 engage with each other. In other words, the rotation by the operation of the operating lever 202 rotates the second gear 207 around the rotation center axis 302. In addition, along with the rotation of the second gear 207, the first gear 114 that engages with the second gear 207 rotates around the rotation center axis 301. Thus, the first gear 114 and the second gear 207 function as a rotation transmission mechanism that transmits the rotation of the second shaft 203 to the first shaft 107.

Rotating the operating lever 202 in this way, the extender holding cylinder 104 is rotated so that the first lens unit 102 can be inserted into the optical path of the main optical system of the lens barrel (the lens barrel body) or the first lens unit 102 can be retracted from the optical path. In the present embodiment, when the operating lever 202 is rotated in the counterclockwise direction, the center position of the first lens unit 102 is displaced from the optical axis 300 of the main optical system and the first lens unit 102 is retracted from the optical path (FIG. 5A). On the other hand, when the operating lever 202 is rotated in the clockwise direction, the center position of the first lens unit 102 coincides with the optical axis 300, and the first lens unit 102 is inserted into the optical path (FIG. 5B). However, the present embodiment is not limited to this, and the relation between the rotation direction of the operating lever 202 and the insertion or the retraction of the first lens unit 102 may also be set conversely.

According to each of the embodiments described above, the second shaft that transmits the rotation to the first shaft that is integrally attached to the extender is attached to the exterior ring. Therefore, if the exterior ring is removed, an exterior part that is attached to the lens barrel can be removed by passing through the extender without changing the performance of the main optical system of the lens barrel. In other words, the exterior part to which a zoom ring, a focus ring, an AF switch, an IS switch, or the like is attached can be changed without varying the performance of the main optical system. Therefore, according to each of the embodiments described above, a lens barrel that improves maintainability and a camera system (an image pickup apparatus) including the lens barrel can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-113762, filed on May 17, 2012, which is hereby incorporated by reference herein in its entirety.

What is claimed is:

1. A lens barrel comprising:
   a fixed cylinder configured to hold a plurality of lens units that constitute a main optical system;
   an extender configured to be rotatably held by the fixed cylinder and disposed between the plurality of lens units;
   a first shaft configured to rotate the extender around a first axis that is parallel to an optical axis of the main optical system so that the extender is inserted into or retracted from an optical path of the main optical system;
   a second shaft configured to rotate around a second axis that is parallel to the optical axis so as to transmit a rotation to the first shaft; and
   an exterior member attached to the fixed cylinder,
   wherein the second shaft is attached to the exterior member.

2. The lens barrel according to claim 1, wherein:
   the first axis and the second axis are the same axis, and
   the first shaft and the second shaft engage with each other so as to perform a rotation transmission.

3. The lens barrel according to claim 1, wherein:
   the first axis and the second axis are not the same axis, and
   the lens barrel further includes a rotation transmission mechanism that transmits the rotation of the second shaft to the first shaft.

4. An image pickup apparatus including a lens barrel comprising:
   a fixed cylinder configured to hold a plurality of lens units that constitute a main optical system;
   an extender configured to be rotatably held by the fixed cylinder and disposed between the plurality of lens units;
   a first shaft configured to rotate the extender around a first axis that is parallel to an optical axis of the main optical system so that the extender is inserted into or retracted from an optical path of the main optical system;
   a second shaft configured to rotate around a second axis that is parallel to the optical axis so as to transmit a rotation to the first shaft; and
   an exterior member attached to the fixed cylinder,
   wherein the second shaft is attached to the exterior member.

\* \* \* \* \*